July 29, 1930.  J. W. TALVITIE  1,771,694
PLANTING IMPLEMENT
Filed Aug. 30, 1928
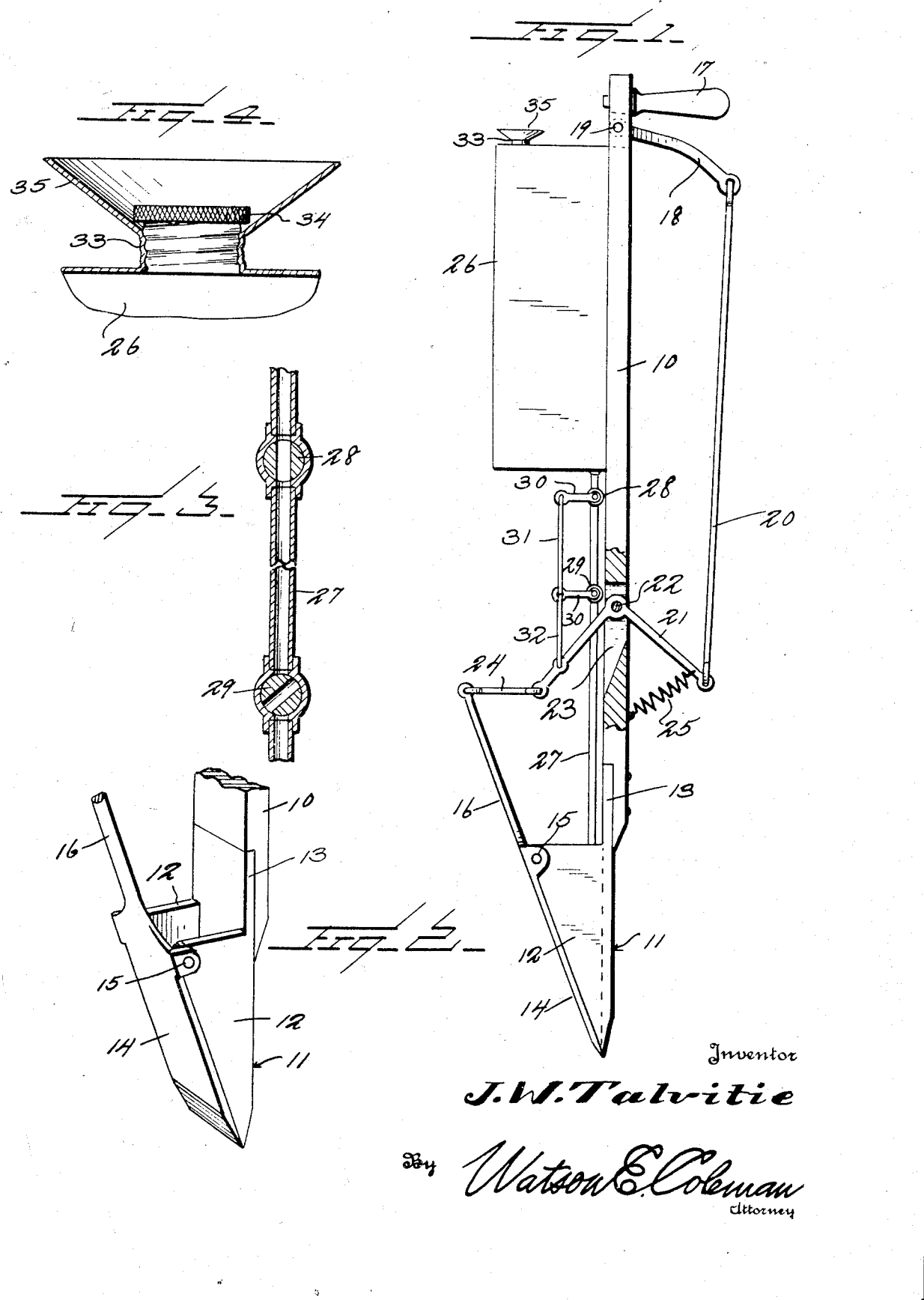
Inventor
J. W. Talvitie
By Watson E. Coleman
Attorney Patented July 29, 1930

1,771,694

UNITED STATES PATENT OFFICE

JOHN W. TALVITIE, OF BRUSH PRAIRIE, WASHINGTON

PLANTING IMPLEMENT

Application filed August 30, 1928. Serial No. 303,047.

This invention relates to planting devices of that character wherein there is a supporting shank having at its lower end a sectional plant receptacle of such shape that it may be forced down into the earth, the shank being provided with means whereby the receptacle may be opened to discharge the plant into the earth and the planter withdrawn.

One of the objects of the present invention is to provide a device of this character having a wedge-shaped spade-like plant receptacle at the lower end of the shank, one side of which is closed by a swinging gate or blade, the receptacle being of such form that it may be readily forced down into the very hard ground or even rocky ground, and then opened to permit the discharge of the plant.

A further object is to provide a water tank mounted upon the shank of the planter, this water tank being normally closed and providing means whereby a definite or measured quantity of water may be discharged into the plant holder or receptacle when the plant has been set and by the same motion which opens and releases the plant.

Another object is to provide a planter which may be operated with one motion with one hand, thus permitting the operator to use the other hand to feed plants into the receptacle.

Other objects will appear in the course of the following description.

My invention is illustrated in the accompanying drawings, wherein—

Figure 1 is a side elevation of a planter constructed in accordance with my invention, partly in section;

Figure 2 is a perspective view of the lower end of the planter;

Figure 3 is a sectional view through the water duct pipe and the valves; and

Figure 4 is an enlarged sectional view showing the inlet funnel.

Referring to these drawings, 10 designates a supporting shank of any suitable material about three-quarters of an inch thick and about four inches wide. Attached to the lower end of this shank is a steel pocket or receptacle 11 having a rear wall and two side walls 12. This pocket is wedge-shaped, that is, the rear wall extends straight downward in line with the shank 10, while the side walls are triangular in form. The pocket is provided with the tang 13 which extends up into a recess in the shank 10 and is riveted or otherwise attached thereto. Pivoted upon the side walls 12 is a blade 14 which normally closes the side of the pocket and extends downward and inward at a sharp angle to the rear wall of the pocket. This blade at its upper end is formed with ears 15 which lap over the side walls 12 and are pivoted thereto. The blade is provided with the shank 16 extending upward and outward.

Mounted upon the upper end of the shank 10 is the handle 17 extending at right angles to the shank and whereby the implement may be forced into the ground or lifted. Pivoted upon the shank 10 below the handle 17 but in such position that the hand that grasps the handle 17 may also grasp it, is a controlling handle 18 in the form of a lever pivoted at 19 and having a link connection 20 to a bell crank lever 21 pivoted at 22 upon the shank. Preferably the levers 18 and 21 will be pivoted in a slot or kerf 23 in the shank. One arm of the bell crank lever 21 is connected to the link 20 and the other arm is connected by a link 24 to the upwardly extending arm or prolongation 16 of the blade 14. A spring 25 urges one arm of the bell crank lever downward and urges the link 20 and the lever 18 downward.

Mounted upon the shank 10 adjacent its upper end is a tank 26 having a filling opening at its top and of course provided at its upper end with an air vent or inlet. Extending downward from this tank is a pipe 27 which discharges into the upper end of the pocket 11. Disposed in the length of the pipe 27 and above the bell crank lever 21 are two valves 28 and 29. These are so set that when the valve 28 opens the valve 29 is closed and when the valve 29 opens the valve 28 closes. These valves are provided with outwardly extending handles 30 connected by a pivoted link 31 and this link 31 and the handle are in turn connected by a link 32 to one arm on the bell crank lever 21. When the lever 18 is pulled outward to discharge the plant, the first part of the movement of the bell crank lever 21 acts to open the valve 29 and close the valve 30, so that a predetermined amount of water passing down onto the plant just before the gate or blade 14 is open to permit the discharge of the plant.

Only a predetermined amount of water can be discharged upon the plant by this mechanism. The tank 26 is provided with the upwardly extending nipple 33 adapted to be closed by a screw cap 34 and surrounding this nipple is a shallow funnel 35. This funnel may have screw-threaded engagement with the threads on the nipple or it may be soldered or otherwise formed on the nipple 33. This funnel permits the ready filling of the water tank without the necessity of an extra funnel being carried around, with the possibility of its being mislaid when wanted.

In actual practice I have found that my improved planter may be used in rocky land, very heavy clay soil, and even where the land is extremely hard. The handle 17 is held in the right hand and the point which is formed by the pocket 11 and the blade 14 is jabbed into the earth three or four inches, then the fingers of the right hand engage the lever 18 which opens the pocket by shifting the blade 14 outward, releasing the plant that has been already dropped into the pocket.

As before stated, just previous to the opening of the gate or blade 14, a definite quantity of water is released upon the plant. When the blade has been opened the planter is raised, thus leaving the plant in the earth and the earth will close around the plant, the operator then stepping on the earth close around the plant and firming the earth around it.

With this implement a man may carry a bag of cabbage or kale plants over his shoulder and he will drop a plan into the pocket 11 with his left hand and then force the transplanter into the earth a few inches, pulling up on the lever 18 watering the plant and at the same time releasing it and then he pulls up the whole transplanter, stepping on the earth as he moves along and repeats the operation.

It will be seen that this planter is operated with one motion with one hand, thus permitting the other hand to be used for dropping the plants. With this implement also there will be no waste of water and one plant will not get more than another, unless of course it should be absolutely necessary, in which case the operator, without lifting the planter can again operate the lever 18 which will release a second supply of water. It will be noted that the water tank is closed at its top. This is important for the reason that it often occurs in the field that the workman desires to let the planter down. This may be done in this case without the water leaking out or spilling.

One of the important features of this invention resides in the peculiar shape of the "shovel" or pocket 11. This, as before remarked, has an acutely angled wedge-shaped wall and is very sharp and consequently may be forced down into even the hardest soil to a sufficient depth for planting. I do not wish to be limited to certain of the details of construction as these might be varied without departing from the spirit of the invention as set forth in the appended claims.

What I claim is—

1. A planter of the character described comprising a shank carrying upon its lower end an approximately wedge-shaped pocket and having one side wall hinged to the body of the pocket, a handle at the upper end of the shank, a lever pivoted below the handle and adapted to be engaged by the fingers of the hand grasping the handle, said lever being operatively connected to the pivoted wall of the pocket to cause the pivoted wall to swing open when the lever is raised, a tank mounted upon the shank and having a discharge pipe extending into the pocket, two valves mounted in spaced relation in said pipe and so disposed that when the lowermost valve is closed the uppermost valve is opened and vice-versa, and an operative connection between said valves and the pocket opening mechanism causing the opening of the lower valve and the closing of the upper valve simultaneously with the opening of the pocket.

2. A planter of the character described comprising a shank having a handle at its upper end and at its lower end carrying a pocket, the pocket having a rear wall and two acutely angled side walls, a blade forming the fourth wall of the pocket and means mounted upon the shank and operatively connected to the blade whereby the blade may be opened, means urging the blade to a closed position, a tank mounted upon the shank, a discharge pipe extending above the pocket and valves mounted in spaced relation in the length of said pipe, and so connected to the blade operating means that when the blade of the pocket is opened, the upper valve shall be closed and the lower valve opened, and when the blade is closed the lower valve will close and the upper valve will open.

In testimony whereof I hereunto affix my signature.

JOHN W. TALVITIE.